Patented Jan. 13, 1953

2,625,561

UNITED STATES PATENT OFFICE 2,625,561

FLUOROAROMATIC ISOCYANATES

James H. Werntz, Wilmington, Del., assignor to E. I. du Pont de Nemours and Company, Wilmington, Del., a corporation of Delaware No Drawing. Application October 27, 1950,
Serial No. 192,627

7 Claims. (Cl. 260—453)

This invention relates to organic fluorine compounds and more particularly to fluoroaromatic esters of isocyanic acid.

This invention has as an object the preparation of intermediates for new chemical compounds and for the preparation of herbicides. Other objects will appear hereinafter.

These objects are accomplished by the present invention of compounds having an isocyanate group, —NCO, directly attached to nuclear carbon of a carbocyclic aromatic ring, and fluorine not more than one carbon removed from nuclear carbon of said aromatic ring.

A convenient method for preparing these new fluorine-containing aromatic isocyanates is illustrated by the following general equation wherein Ar represents the fluorine-containing aromatic residue:

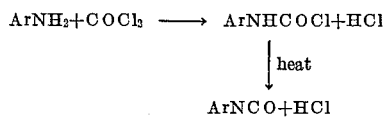

The reaction is accomplished by bringing in contact a fluorine-containing aromatic, i. e., fluoroaromatic, primary amine or a salt thereof, such as a mineral acid salt, with an excess of phosgene, usually in a suitable inert liquid medium, and heating to convert the aromatic carbamyl chloride first formed to the corresponding isocyanate. A suitable procedure consists in slowly adding at a temperature of —15 to 10° C., the aromatic primary amine, preferably the free base, dissolved or suspended in an inert liquid diluent such as dry dioxane, dry dibutyl ether, dry benzene, dry toluene and the like, to a stirred solution of phosgene, preferably in excess, dissolved in a similar diluent. Upon completion of addition the stirred reaction mixture is heated at a temperature of from 25–140° C. until the reaction is completed, usually not more than 4 to 5 hours. It is generally desirable to heat the mixture at moderate temperatures, for example 25–50° C., during the first part of the reaction and then slowly increase the temperature to reflux. The fluorine-containing aromatic isocyanate is then isolated by distillation, extraction, crystallization or other suitable means depending on whether the product is liquid or solid and the nature of the reaction medium, i. e., the liquid diluent employed.

Although chemically equivalent amounts of the aromatic primary amine and phosgene can be employed, it is ordinarily desirable, in order to avoid side reactions such as the formation of carbanilides, to maintain during reaction an excess of phosgene, for example 1.5 to 10 mols of phosgene for each mol of amine reactant processed. In most cases two to three mols of phosgene per mol of amine give the best and most economical results.

The high boiling ethers, particularly dioxane, are especially desirable diluents because, aside from their inert characteristic, they are, in most cases, good solvents for the reactants employed.

The following examples in which parts are by weight are illustrative of the invention.

EXAMPLE I

*m-Trifluoromethylphenyl isocyanate*

One hundred (100) parts of m-aminobenzotrifluoride was dissolved in 100 parts of methanol. Fifty-six (56) parts of concentrated hydrochloric acid (37% hydrogen chloride) was dropped slowly into the reaction mixture which was held at 20° C. by exterior cooling. The methanol solution was then poured into 1600 parts of acetone, and the mixture was concentrated by heating on the steam bath. On cooling, crystals of m-aminobenzotrifluoride hydrochloride separated which were filtered off, washed with acetone, and dried in a vacuum oven for eight hours at 70° C. After pulverization, the m-aminobenzotrifluoride hydrochloride was slowly added to 500 parts of anhydrous dioxane which had been saturated with phosgene at about 65–70° C. The reaction mixture was then heated for three hours at 70° C. during which time phosgene was passed in continuously. Dioxane was removed by distillation under nitrogen at about 50 mm. pressure. Twenty-seven (27) parts of m-trifluoromethylphenyl isocyanate was recovered by distillation. It boiled at 54° C. at 11 mm. It was soluble in toluene and reacted exothermally with ethanol to form the urethane derivative.

*Analysis.*—Calculated for $C_8H_4F_3NO$: F, 30.5%. Found: F, 31.3%.

EXAMPLE II

*m—Fluorophenyl isocyanate*

A solution of 96.3 parts of m-fluoroaniline in 97 parts of dry dioxane was added dropwise with stirring to a solution of 297 parts of phosgene in 243 parts of dry dioxane maintained at —10 to 0° C. The reaction mixture was stirred at 25° C. for two hours after the addition had been completed and was then heated slowly to reflux temperature. Two hundred forty-three (243) parts of dioxane was removed by distillation at atmospheric pressure. Vacuum distillation of the residue yielded 72 parts of m-fluorophenyl isocyanate boiling at 66-68.5° C. at 29 mm. pressure. This amounts to a yield of 61% of the theoretical.

*Analysis.*—Calculated for $C_7H_4FNO$: C, 61.30%; H, 2.92%. Found: C, 61.58%; H, 3.37%.

This invention is generic to fluoroaromatic isocyanates wherein the isocyanate, —NCO, group is on nuclear carbon of an aromatic ring and the fluorine is not more than one carbon, and that aliphatic, removed from said ring. Because of availability of the starting fluoroaromatic primary amines from which the isocyanates are prepared, however, the mononuclear or monocyclic fluoroaromatic isocyanates are preferred. The invention includes then within its scope o-fluorophenyl isocyanate, p-fluorophenyl isocyanate, o-trifluoromethylphenyl isocyanate, p-trifluoromethylphenyl isocyanate, 2,4-difluorophenyl isocyanate, 2-methyl-4-fluorophenyl isocyanate, 4-methoxy-3-fluorophenyl isocyanate, 4-ethoxy-3-fluorophenyl isocyanate, m-difluoromethylphenyl isocyanate, 4-chloro-3-trifluoromethylphenyl isocyanate, 2-nitro-4-trifluoromethylphenyl isocyanate, 6-carboxy-3-trifluoromethylphenyl isocyanate, etc. The fluoroaromatic isocyanates of this invention can be prepared by the above reaction of phosgene with the corresponding amine or amine hydrochloride. Suitable amines include o-fluoroaniline; p-fluoroaniline, o-trifluoromethylaniline; p-trifluoromethylaniline; 2,4-difluoroaniline, 2-methyl-4-fluoroaniline; 4-methoxy-3-fluoroaniline; 4-ethoxy-3-fluoroaniline; m-difluoromethylaniline; 4-chloro-3-trifluoromethylaniline; 2-nitro-4-trifluoromethylaniline; 6-carboxy-3-trifluoromethylaniline and the like. The isocyanates of this invention can have substituents on the ring other than the fluorine-containing substituent, e. g., chloro, nitro, alkoxy, such as methoxy and ethoxy, hydrocarbon, preferably methyl, and carboxy.

Especially preferred because, in general, of lower cost are the mononuclear fluoroaryl isocyanates having no more than three fluorine atoms, the fluorine being attached not more than one carbon removed from the aryl ring, said carbon being joined only to nuclear carbon and fluorine.

The new fluorine-containing aromatic isocyanates of this invention provide excellent laundry-fast water-repellent finishes to cellulosic substrates. For example, cotton fabrics impregnated with 3% to 6% of a polyamine obtained from reductive amination of ethylene/carbon monoxide polymer and then aftertreated with a toluene solution of m-trifluoromethylphenyl isocyanate are made water-repellent. This water-repellent finish is more washfast than that provided by present commercial durable water-repellents.

The new isocyanates of this invention are also especially desirable chemical intermediates useful for the preparation of dyestuffs and biological materials such as pharmaceuticals and herbicides.

It is apparent that many widely different embodiments of this invention may be made without departing from the spirit and scope thereof; and, therefore, it is not intended to be limited except as indicated in the appended claims.

What is claimed is:

1. m-Trifluoromethylphenyl isocyanate.
2. m-Fluorophenyl isocyanate.
3. A fluorophenyl isocyanate wherein the fluorine is directly attached to nuclear carbon.
4. A mononuclear fluoroaryl isocyanate wherein the fluorine is directly attached to nuclear carbon.
5. A mononuclear aromatic isocyanate containing in addition to the isocyanate group, and that on nuclear carbon, only fluorine, carbon, and hydrogen, the fluorine being not more than one carbon, and that aliphatic, removed from the ring, said aliphatic carbon being free from hydrogen.
6. A mononuclear aromatic isocyanate having on the one nucleus an isocyanate, —NCO, group and a fluoro substituent wherein the fluorine is not more than one carbon, and that aliphatic, removed from aromatic carbon, said aliphatic carbon being free from hydrogen.
7. A mononuclear aromatic isocyanate having on the one nucleus an isocyanate, —NCO, group and a fluoro substituent wherein the fluorine is not more than one carbon, and that aliphatic, removed from aromatic carbon.

JAMES H. WERNTZ.

REFERENCES CITED

The following references are of record in the file of this patent:

UNITED STATES PATENTS

| Number | Name | Date |
|---|---|---|
| 2,311,046 | Greenhalgh | Feb. 16, 1943 |
| 2,362,648 | Lichty | Nov. 14, 1944 |
| 2,476,779 | Sturgis | July 19, 1949 |